United States Patent
Morgan

(10) Patent No.: US 6,966,444 B2
(45) Date of Patent: Nov. 22, 2005

(54) FILTER WITH SNAP-FIT FILTER BAG

(76) Inventor: Howard W. Morgan, 100 Anchor Rd. P.O. Box 735, Michigan City, IN (US) 46360

( * ) Notice: Subject to any disclaimer, the term of this patent is extended or adjusted under 35 U.S.C. 154(b) by 0 days.

(21) Appl. No.: 10/664,114

(22) Filed: Sep. 17, 2003

(65) Prior Publication Data
US 2005/0055989 A1 Mar. 17, 2005

(51) Int. Cl.[7] .............................................. B01D 29/27

(52) U.S. Cl. .................... 210/448; 210/452; 210/453; 55/379; 55/381; 55/382

(58) Field of Search ............................... 210/443, 450, 210/444, 455, DIG. 13, DIG. 17, 474, 477, 210/448; 55/377, 378, 379, 502, 381, 382

(56) References Cited

U.S. PATENT DOCUMENTS

| 4,133,769 | A | | 1/1979 | Morgan |
| 4,259,188 | A | * | 3/1981 | Morgan ...................... 210/448 |
| 4,272,263 | A | * | 6/1981 | Hancock ...................... 55/377 |
| 5,137,632 | A | * | 8/1992 | Morgan, Jr. ................. 210/445 |
| 5,376,271 | A | | 12/1994 | Morgan |
| 5,643,451 | A | * | 7/1997 | Harris et al. ................ 210/448 |
| 5,840,188 | A | | 11/1998 | Kirsgalvis |
| 5,964,909 | A | * | 10/1999 | Brunner ...................... 55/377 |
| 5,989,421 | A | | 11/1999 | Davis |
| 5,996,810 | A | * | 12/1999 | Bounnakhom et al. ..... 210/443 |
| 6,245,130 | B1 | | 6/2001 | Maybee |

* cited by examiner

Primary Examiner—Duane Smith
Assistant Examiner—Minh-Chau T. Pham

(57) ABSTRACT

A filter element includes a bag ring which is snap fitted into the filter vessel sidewall and retains both the filter element and a filter basket in the desired location in the vessel until removed.

5 Claims, 4 Drawing Sheets

FILTER WITH SNAP-FIT FILTER BAG

FIELD OF THE INVENTION

The invention disclosed herein relates generally to filters for removing particulates from liquids. More particularly the invention relates to a filter in which the filter element or bag may be snap fit into the filter vessel.

BACKGROUND OF THE INVENTION

It is known to have a filter assembly including a vessel that contains a filter element interposed between fluid flow between an inlet and an outlet in the vessel. In such an arrangement it is common for a filter element to include two basic parts: a filter bag of a generally fibrous material for filtering out particulates from the fluid, and a bag ring secured to the edges of the bag for retaining the filter bag in position within the filter vessel. It is also common to have a porous rigid basket within the vessel between the bag and the outlet in order to support the bag.

A problem with the current art as described, however, is that the filter element and basket often tend to float out of position when fluid flow is stopped through the filter assembly. This problem is exacerbated when the basket is composed of plastic instead of a heavier metal. Therefore it would be advantageous to have a filter assembly which can be economically manufactured and which includes a filter element that will maintain its position within the vessel when fluid flow is stopped.

SUMMARY OF THE INVENTION

A filter assembly is disclosed in which a filter element is snap fit into the filter vessel wall. The snap fit is obtained by means of a protrusion or ridge on the exterior side of the filter bag ring which may be resiliently snap fitted into a complementary recess or groove on the interior side of the vessel sidewall. The snap fitted bag ring retains both the filter element and the filter basket in position.

An object of the invention is to provide a filter assembly of economical construction which includes a filter element that will not float out of position within the filter vessel when fluid flow has stopped. Another object of the invention is to provide a filter element that will maintain its position within a filter vessel independently of the vessel lid or cover.

BRIEF DESCRIPTION OF THE DRAWINGS

These and other aspects of the invention will be apparent from the following detailed description, with reference to the figures in which.

DETAILED DESCRIPTION OF THE PREFERRED EMBODIMENT

Figure 1:
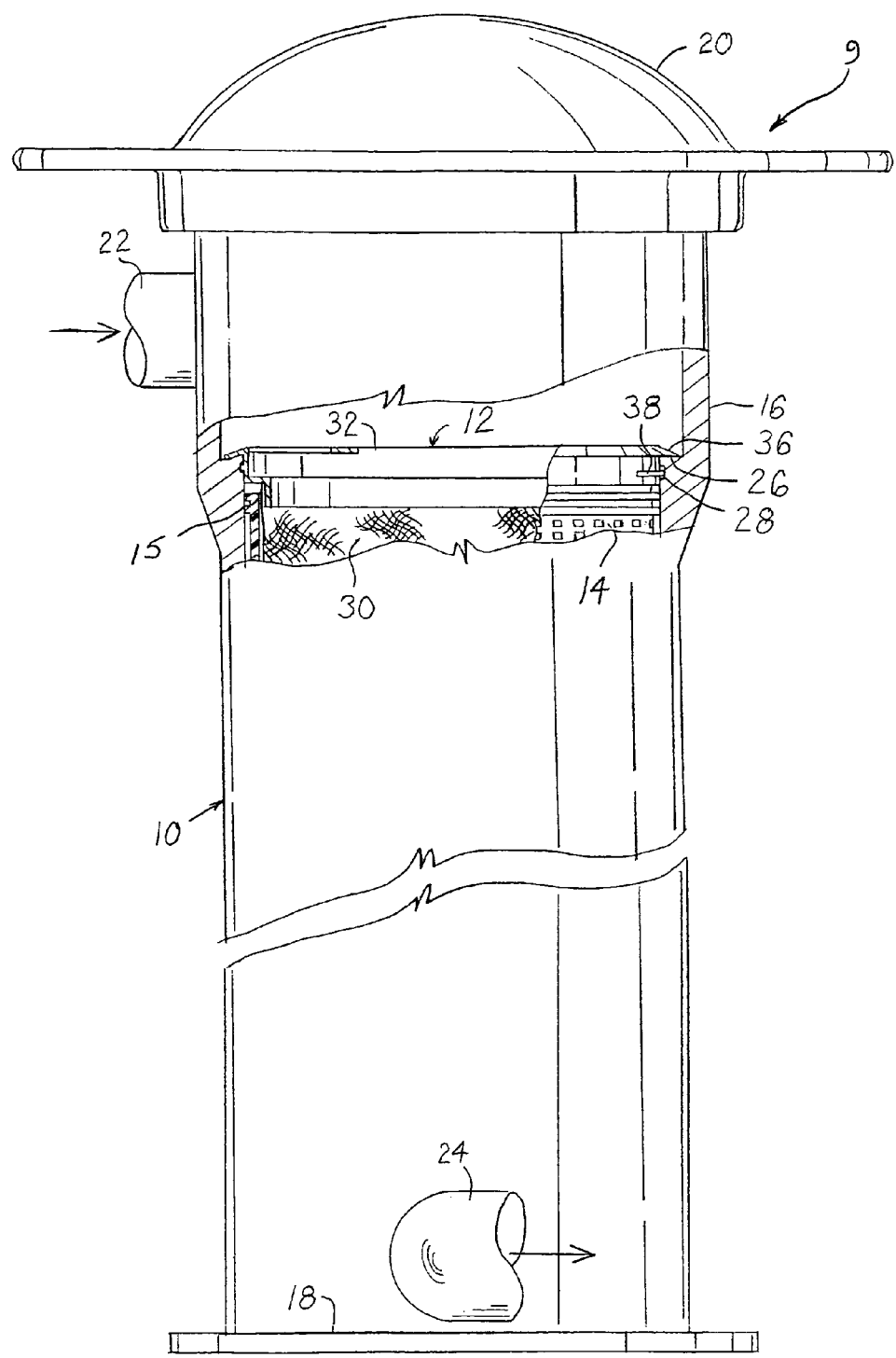
FIG. 1 is a partial cut away side view of a filter assembly showing the filter element and filter basket in position within the filter vessel.

Turning now to the figures, a filter assembly 9 as depicted in FIG. 1 includes a vessel 10, a filter element 12, and a rigid basket 14. Vessel 10 includes a sidewall 16, bottom wall 18, and removable cover or lid 20. An inlet 22 and an outlet 24 in vessel 20 allow fluid flow through the vessel. Vessel sidewall 16 has a generally smooth interior surface except for a shoulder 26 and a groove or notch 28. Shoulder 26 extends around the inner periphery of sidewall between inlet 22 and outlet 24 and is upwardly inclined near its inner or central edge. Groove 28 is recessed into sidewall 16 slightly below shoulder 26 and extends around the inner periphery of the sidewall.

Basket 14 supports filter element 12 within the vessel. Basket 14 is of porous construction for allowing flow of liquid therethrough and is preferably made of plastic. Basket 14 is carried within vessel 10 below shoulder 26. The upper rim 15 of basket 14 is preferably located next to the interior surface of sidewall 16 below groove 28 with the basket extending toward outlet 24.

Filter element 12 includes a filter bag 30 and a bag ring 32. Filter bag 30 is composed of a porous cloth-like filtration material such as woven cloth or blow-molded resins. The mouth of filter bag 30 is secured around its upper edge to bag ring 32 by any suitable process such as heat sealing or gluing.

Figure 2:
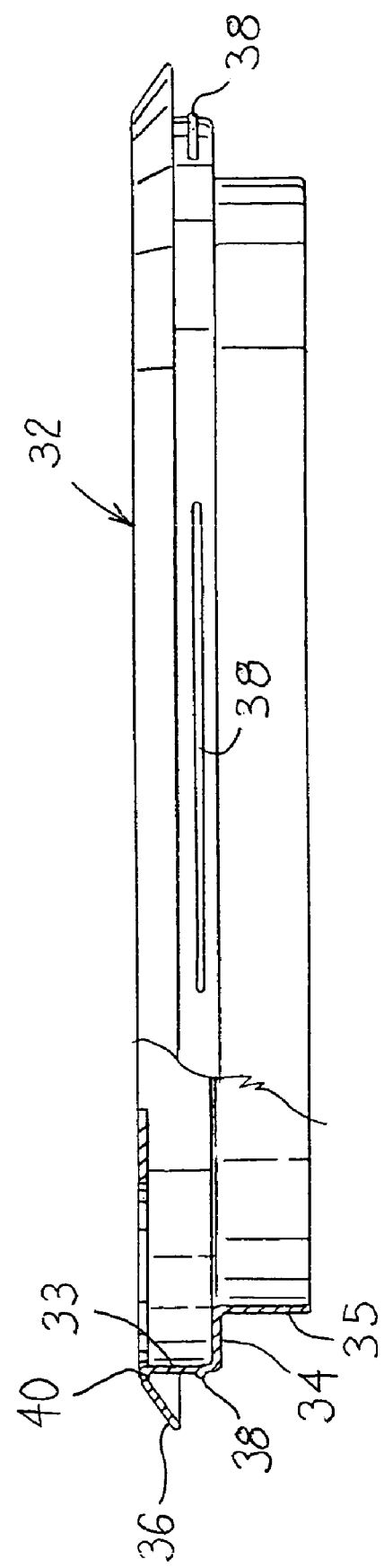
FIG. 2 is a side view in partial cross section of the filter bag ring of the filter element of FIG. 1.
Figure 3:
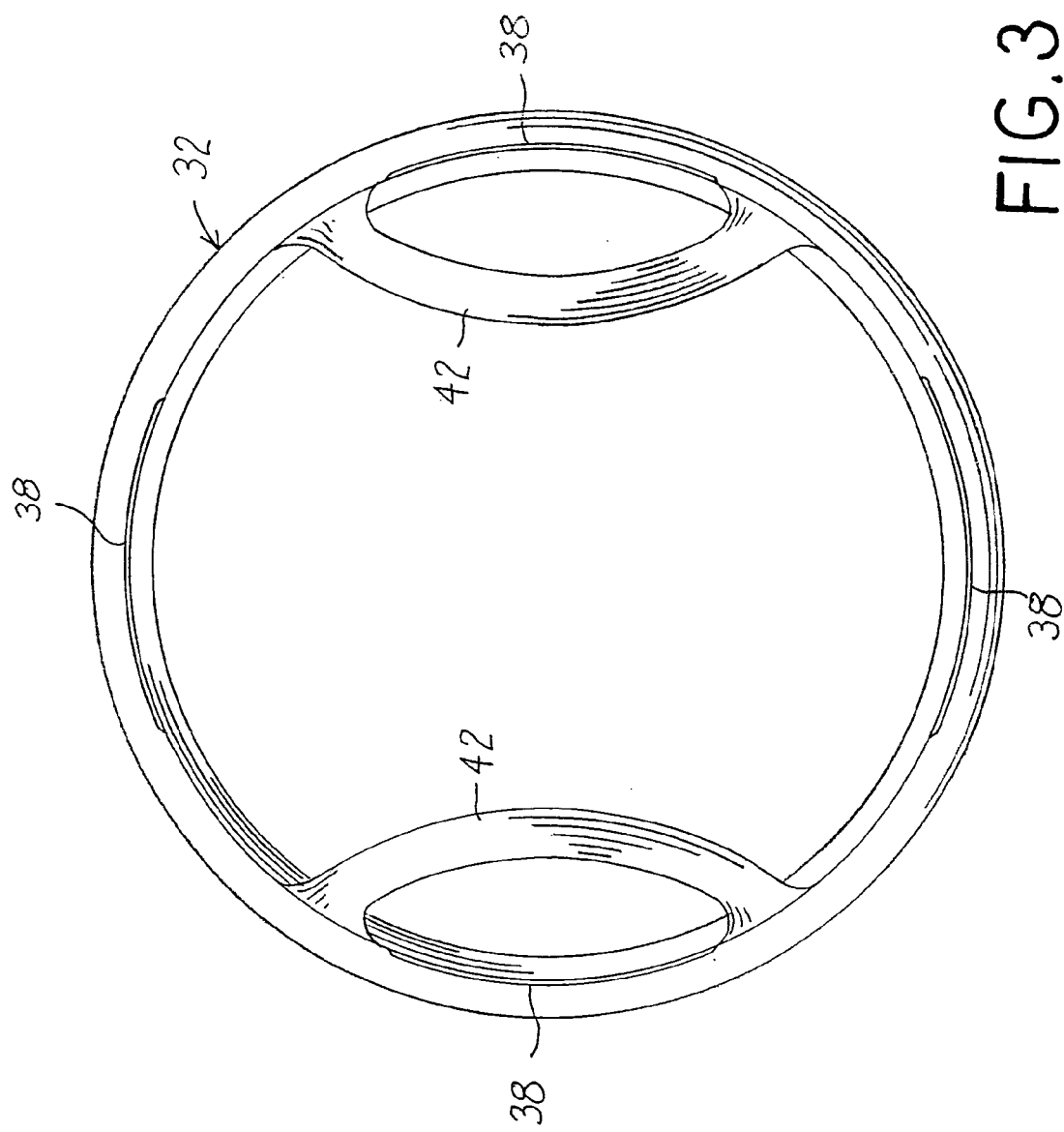
FIG. 3 is a top view of the filter bag ring.

Turning now to FIGS. 2 and 3, bag ring 32 is of generally circular form sized to fit against the inner surface of vessel sidewall 16 at shoulder 26 to form a liquid seal between the bag ring and the vessel sidewall. Bag ring 32 is preferably made of a pliable or flexible, yet shape retaining or resilient material such as nylon or polypropylene. Bag ring 32 has a stepped sidewall defining a horizontal shoulder 34 extending between an upper sidewall 33 and a lower sidewall 35. An outer peripheral flange 36 is downwardly angled from upper ring sidewall 33. Annular ribs 38 extend about the outer periphery of upper ring sidewall 33. Upper ring sidewall 33 is sized to seat against vessel sidewall 16 below shoulder 26. Ribs 38 are co-planar and angularly spaced intermittently around bag ring, but a single continuous circumferential rib could also be used. In the depicted embodiment, four ribs 38 angularly spaced at right angles from each other extend intermittently about the upper ring sidewall 33. Flange 36 forms a recess 40 between the flange and upper ring sidewall 33. A pair of handles 42 for gripping the filter element span across interior portions of bag ring 32.

Figure 5:
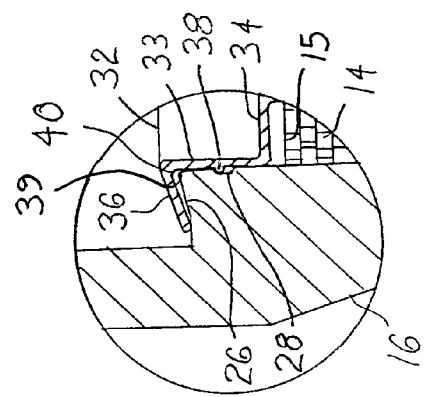
FIG. 5 is a detailed cross section showing the filter element fully inserted without fluid flow through the vessel.
Figure 4:
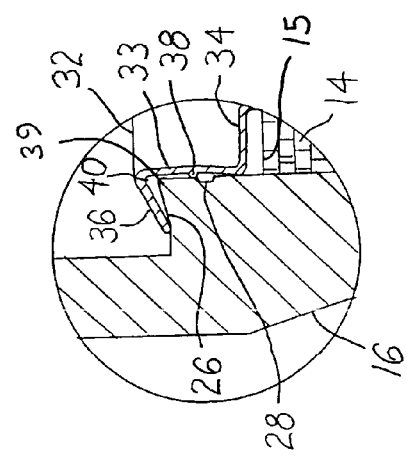
FIG. 4 is a detailed cross section of the bag ring and vessel wall before the filter element is fully inserted.

With basket 14 placed within vessel 10 below shoulder 26, filter element 12 is pushed into vessel 10 with its flange 36 seating upon shoulder 26 and ribs 38 in bag ring 32 snap-fitting into groove 28. As filter element 12 is inserted into vessel 10 (FIG. 4), ribs 38 cause upper ring sidewall 33 be flexed inwardly as the ribs pass over the vessel side wall below shoulder 26. When ribs 38 reach groove 28, upper ring sidewall 33 flexes back against vessel sidewall 16 with ribs 38 projecting into groove 28 and with bag ring flange 36 being slightly flexed against shoulder 26 to urge ribs 38 into contact with the upper edge of the groove as shown in FIG. 5. Ribs 38 prevent bag ring 32 and basket 14 from floating out of position when fluid flow through the filter assembly is terminated. The upper interior edge 39 of inclined shoulder 26 fits into recess 40 with flange 36 overlying and contacting the shoulder. The upper rim 15 of basket 14 is located below shoulder 34 and preferably between vessel sidewall 16 and lower bag ring sidewall 35. The snap fit bag ring 32 with its ribs 38 fitted into side wall grooves 28 prevents basket 14 from floating out of position without requiring other retaining means for the basket or the bag ring.

Figure 6:
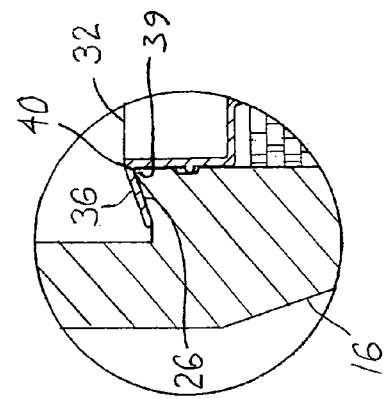
FIG. 6 shows the bag ring in position within the vessel wall with fluid flow through the vessel.

During fluid flow through the vessel (FIG. 6), bag ring flange 36 is urged fully downwardly against shoulder 26, causing the inclined edge 39 of the shoulder to nest within bag ring recess 40 to create a liquid seal between bag ring 32 and vessel sidewall 16 and to assist in maintaining the bag ring in position during fluid flow through the filter assembly.

To remove filter element 12 from vessel 10, bag ring 32 is pulled out of vessel 10 by using handles 42 to urge ribs 38 out of groove 28 and past shoulder 26.

The above subject invention is not to be limited to the details given above for the preferred embodiment, but may be modified within the scope of the impending claims.

I claim:

1. A filter assembly comprising a vessel and a filter element; said vessel having a sidewall, a bottom wall, and a removable cover; an inlet and an outlet in said vessel for fluid flow through said vessel; said vessel sidewall including an interior shoulder located between said inlet and outlet; said sidewall having a groove formed therein located between said shoulder and said outlet; said filter element including a filter bag having an opening defined by a flexible bag ring; said filter element interposed within said vessel between said inlet and outlet; a filter basket seated in said vessel between said inlet and outlet for supporting said filter bag; said filter bag extending into said filter basket; said bag ring including a sidewall terminating in an outturned peripheral flange; a rib protruding from said bag ring sidewall; said flange overlying and seated against said vessel sidewall shoulder; said rib fitting into said groove in said vessel sidewall to secure said filter element in said vessel.

2. The filter assembly of claim 1 wherein said basket includes an upper rim; said basket rim being located between said vessel sidewall and said bag ring.

3. The filter of claim 1 wherein said vessel sidewall shoulder is upwardly angled; said bag ring flange being downwardly angled to form a recess between the flange and said bag ring sidewall; said vessel sidewall shoulder fitted within said recess.

4. The filter assembly of claim 1 wherein said rib is an annular ridge intermittently located about the periphery of said bag ring; and said groove extends about the inner periphery of the vessel sidewall.

5. The filter assembly of claim 1 wherein said bag ring flange is flexed against said vessel sidewall shoulder as said rib is fitted in said groove; said groove being larger than said rib to allow movement of the rib relative to the groove and further flexing of said bag ring flange when there is fluid flow through said vessel.

* * * * *